United States Patent
Fotsch (10) Patent No.: US 10,691,422 B2
(45) Date of Patent: Jun. 23, 2020

(54) PROGRAMMABLE DEVICE PROVIDING VISUAL FEEDBACK OF BALANCING OF OPENING AND CLOSING STATEMENTS OF PROGRAMMING STRUCTURES AND NESTING LEVEL

(71) Applicant: Texas Instruments Incorporated, Dallas, TX (US)

(72) Inventor: Frederick Conrad Fotsch, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/927,652

(22) Filed: Mar. 21, 2018

(65) Prior Publication Data

US 2019/0294419 A1     Sep. 26, 2019

(51) Int. Cl.
*G06F 9/44* (2018.01)
*G06F 8/34* (2018.01)

(52) U.S. Cl.
CPC .................. *G06F 8/34* (2013.01)

(58) Field of Classification Search
CPC .......................................................... G06F 8/34
USPC ........................................ 717/109, 141–144
See application file for complete search history.

(56) References Cited

U.S. PATENT DOCUMENTS 4,965,765 A * 10/1990 Brown ............... G06F 8/33
714/46
6,216,143 B1 * 4/2001 Ryan ................. G06F 11/323
714/E11.181

OTHER PUBLICATIONS

Stack Overflow, "PHP Parse/Syntax Errors; and How to solve them?", 2016, retrieved from https://stackoverflow.com/questions/18050071/php-parse-syntax-errors-and-how-to-solve-them, 20 pages (Year: 2016).*
Zinenko et al., "Manipulating Visualization, Not Codes", 2015, Fifth International Workshop on Polyhedral Compilation Techniques, Amsterdam, The Netherlands, 14 pages (Year: 2015).*
Jon Hood, "Word: Quick Text Selection Methods", 2015, KnowledgeWave Blog, 4 pages (Year: 2015).*
ExtendOffice, "How to quickly select non-adjacent cells or ranges in Excel?", 2015, retrieved from https://web.archive.org/web/20151207125402 /https://www.extendoffice.com/documents/excel/761-excel-select-non-adjacent-cells-ranges.html, 5 pages (Year: 2015).*

* cited by examiner

*Primary Examiner* — Ted T. Vo
(74) *Attorney, Agent, or Firm* — Rose Alyssa Keagy; Charles A. Brill; Frank D. Cimino (57) ABSTRACT

Providing visual feedback of balancing of programming structure hierarchy in a program entered on a programmable device having a processor, an instruction memory, an input device, and a display screen having a left edge. In an arrangement, at least two control structure opening statements are received, each having an associated control structure. A unique representation is assigned to each of the at least two control structures. The control structure opening statements are displayed in the unique representation assigned to the corresponding control structure beginning at a same location with respect to the left edge of the display. At least two control structure closing sequences are received, and each control structure closing sequence is associated with one of the control structures, respectively.

20 Claims, 10 Drawing Sheets

```
1:   [[0,1,0][1,0,1][0,1,0]] → [A]
2:   For (X,1,3)
3:      For (Y,1,3)
4:         If [A](X,Y)=0
5:         Then
6:            Disp"0"
7:         End
8:         If [A](X,Y)=1
9:         Then
10:           Disp"1"
11:        End
12:     END
13:  END
```

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
```

FIG. 6

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
```

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
```

FIG. 7c

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
12: END
```

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
12: END
13: END
```

FIG. 8

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
12: END
13: END
```

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
12: End
13: End
```

FIG. 9b

```
1:  [[0,1,0][1,0,1][0,1,0]] → [A]
2:  For (X,1,3)
3:  For (Y,1,3)
4:  If [A](X,Y)=0
5:  Then
6:  Disp "0"
7:  End
8:  If [A](X,Y)=1
9:  Then
10: Disp "1"
11: End
12: End
13: End
```

1001

```
def foo(x):
    if x == 0:
        bar()
        baz()
    else:
        qux(x)
    foo(x - 1)
```

```
def foo(x):
    if x == 0:
        bar()
        baz()
    else:
        qux(x)
    foo(x - 1)
```

FIG. 11

1301 def foo(x):

PROGRAMMABLE DEVICE PROVIDING VISUAL FEEDBACK OF BALANCING OF OPENING AND CLOSING STATEMENTS OF PROGRAMMING STRUCTURES AND NESTING LEVEL

TECHNICAL FIELD

This disclosure relates generally to programmable devices, and more particularly to programmable devices that provide a visual feedback in regard to programming structures.

BACKGROUND

Structured programming is a programming methodology in which programs are written using control structures and basic blocks. The control structures, which include conditional branches and loops, determine the flow of control through a program during execution of the program.

Correct programming requires adherence to grammatical rules of a selected programming language. Control structures are opened and closed according to the syntactic rules of the programming language.

Failing to balance a control structure opening statement with a corresponding closing statement can also cause a program not to execute as expected.

To facilitate understanding of a program, indentation is usually used to illustrate statements that fall within a conditional statement of a loop.

Modern programming environments, often referred to as integrated development environments (IDE) or integrated programming environments (IPE) (herein, the abbreviation "IDE" is used to include both IDE and IPE), provide program entry and editing tools that automate many tasks of a programmer. One example is the automatic indentation of program code as the code is entered by a programmer or read from program memory.

On large screens, such as found on computer workstations as well as modern notebook computers and tablets, windows displaying program code can usually be expanded to sufficient width to accommodate code that has a high level of nesting of control structures and that has the associated deep indentation. However, on smaller screens, for example, hand-held devices such as on programmable calculators, the indentation presents a problem. If a program contains lines that extend beyond the right edge of the device screen, the line is typically either wrapped to the next line, or the display screen can be scrolled horizontally to allow a reader to read the entire line. Both solutions cause a loss of readability of the program and defeat the purpose of indenting the code for readability.

SUMMARY

In a described example, a method of visual feedback of the balancing of programming structure hierarchy begins with receiving at least two control structure opening statements, each having an associated control structure. The method continues with assigning a unique representation to each of the at least two control structures, displaying each control structure opening statement in the unique representation assigned to the corresponding control structure beginning at a same location with respect to the left edge of the display, receiving at least two control structure closing sequences, and associating each control structure closing sequence with one of the control structures, respectively.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
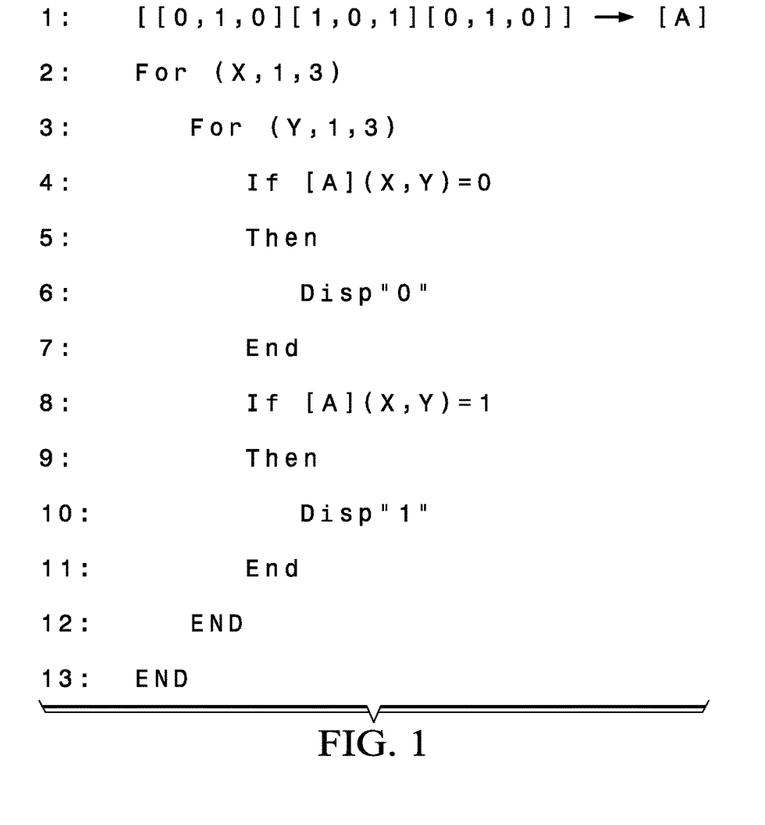
FIG. 1 is a section of computer program code illustrating a common indentation scheme.

FIG. 1 is an illustration of a short computer program 100 written in the BASIC programming language. Readability of computer programs requires some visual feedback of the program structure to the programmer or other program reader. Indentation is a common mechanism used to illustrate statements that fall within a conditional statement or a loop, thereby facilitating the understanding of the structure of a computer program.

FIG. 1 is an illustration of program indentation of a sample program. In the indentation style of FIG. 1, program statements that fall inside the body of a control structure are indented by a few spaces from the left edge of the display showing the program with respect to the statement that starts the control structure and the statement that ends the control structure. The indented statements are nested inside the statements that open and close the control structure. The indented statements have a nesting level that is one greater than the nesting level of the statements that open and close the control structure.

A programmer can use the indentation to visually inspect the code and to identify syntax and logic errors in a program.

For example, in FIG. 1, if the END statement at Line 13 were missing, the opening FOR statement at Line 2 would not be balanced with a corresponding END statement. For BASIC language structures, FOR statements are concluded with an END statement, an example of an explicit programming language control structure closing statement. Thus, leaving out the END statement at Line 13 would be a syntactic error.

Failing to balance a control structure opening statement with a corresponding closing statement can also cause a program not to execute as expected. For example, returning to FIG. 1, if the END statement at Line 7 were omitted, then the IF statement at Line 8 would be executed only if the condition [A] X, Y)=0 held true. However, inspection of the code reveals that the probable intent is for the condition at Line 8 is to be executed as an alternative to the condition of Line 4. Thus, omitting the END statement at Line 7 would produce a program that did not execute as intended.

As can be seen in FIG. 1, control structures may be nested. For example, the loop that begins at Line 3 is nested within the loop that starts at Line 2. Similarly, the If structures that begin at Lines 4 and 8, respectively, are nested within the loop that starts at Line 3. As statements within the scope of a control-structure are indented with respect to the statements that begin and end the control structure, with the deeper level of nesting, there is yet a deeper level of indentation.

However, as indentation of deeply nested structures cause program statements to carry far to the right of the display for programming statement lines, for some programming platforms, where a display is made with a screen width that is relatively narrow (e.g., programmable calculators or smartphones), indentation causes program statements to extend beyond the right vertical edge of the screen (for a display that conventionally reads left to right). In the arrangements, methods are disclosed herein that improve programmable devices having narrow screens by providing visual feedback to programmers and other program readers without indenting program statements.

In an example arrangement, the disclosed programmable device assigns unique colors to program control structures based on nesting level. Another arrangement uses an alternative programmable device that additionally shades the a*n first characters of a programming statement, where a is the number of characters to shade for each nesting level (e.g., a=2, which would shade the first two characters for the first indentation and so on) and n is the nesting level of the control structure to which the statement belongs or a function of the nesting level. Thus, by visual inspection of the displayed code, a user of such programmable devices can readily discern matching opening and closing statements for control structures as well as the nesting level of program statements. The program statements are displayed at a common line starting point at the left edge of the visual display or at a common position adjacent the left edge of the visual display; and the program statements are not indented with respect to one another, which preserves display space for displaying nested programs.

Figure 2:
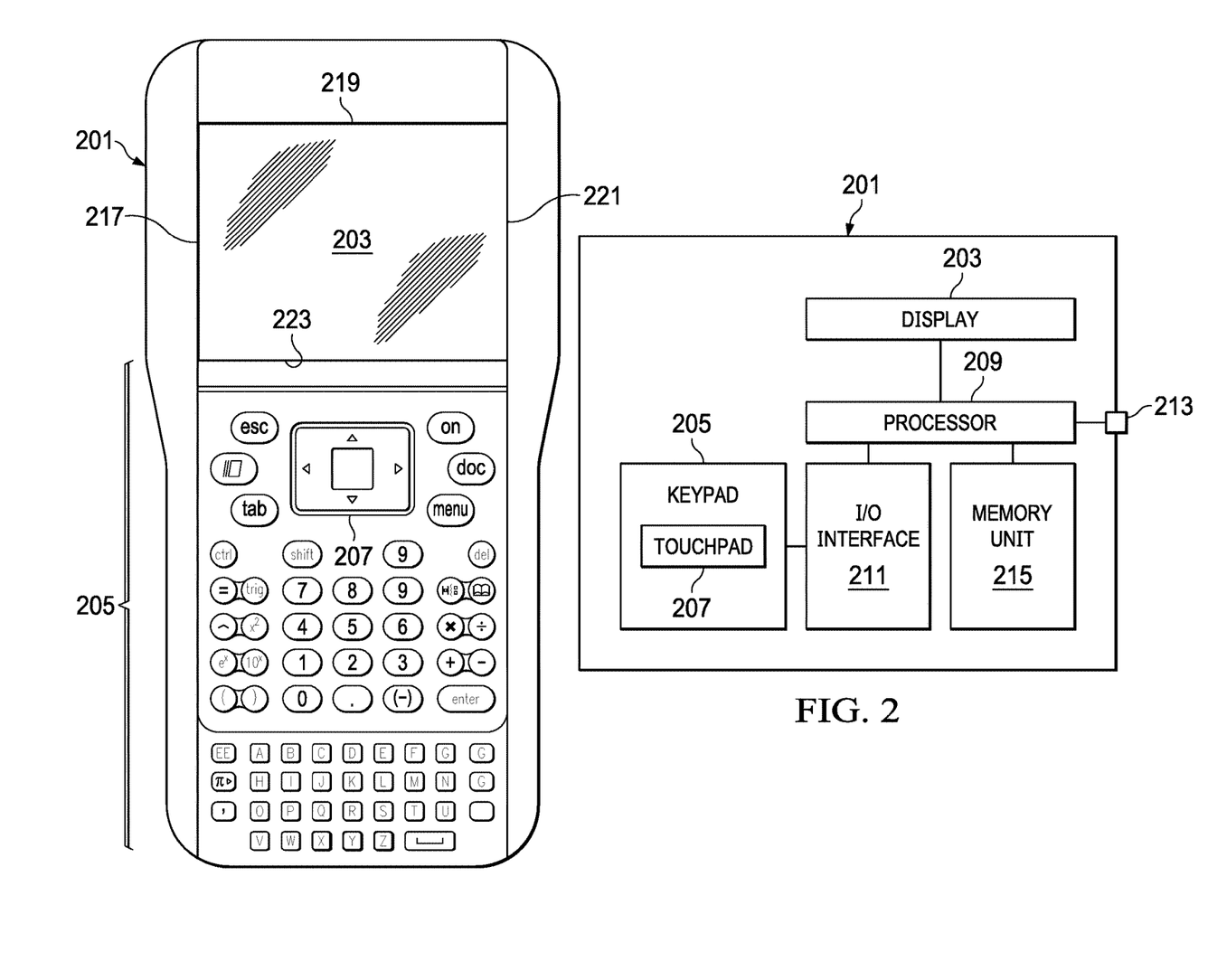
FIG. 2 depicts a programmable device.

FIG. 2 depicts a programmable device 201, for example, a programmable calculator, configured with an IDE that provides program readers, such as programmers, with visual feedback indicative of matching of control structure opening statements and closing statements or nesting level. In an alternative, the programmable device 201 may be a programmable handheld diagnostic device or a smartphone or tablet.

The programmable device 201 includes a graphical display 203, a keypad 205 that includes a touchpad 207. The keypad 205 and touchpad 207 allow a user to enter data (e.g., programming statements) to a processor 209 via an input/output interface 211. Additional input and output may be obtained through an input/output port 213 (e.g., a mini-USB port) from external devices (not shown).

Figure 3:
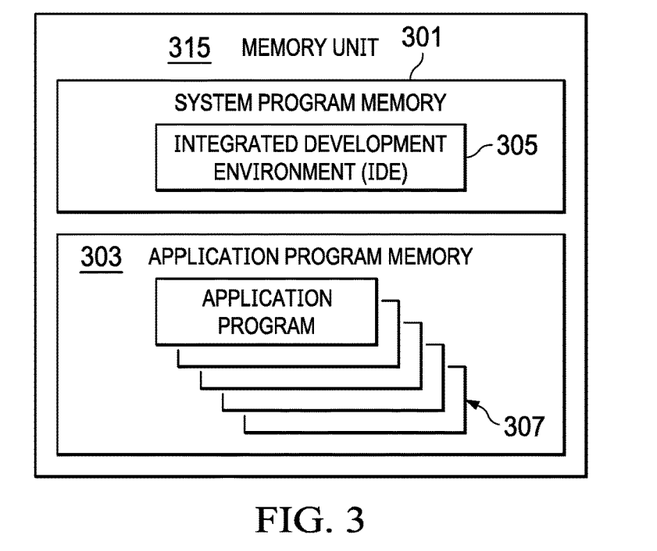
FIG. 3 depicts a program memory of the programmable device of FIG. 2.

The processor 209 is connected to a memory unit 215, which is illustrated in further detail in FIG. 3. The memory unit 215 (which includes, e.g., computer-readable medium such as permanent read-only memory (ROM) and non-persistent memory such as random-access memory (RAM)) stores programs and, optionally, stores non-persistent or persistent data.

For reference purposes, the graphical display 203 has a left edge 217, an upper edge 219, a right edge 221, and a bottom edge 223. In vertical orientation of the programmable device 201, text displayed on the graphical display 203 begins at or near the left edge 217. In some examples, the programmable device 201 may be equipped with a mechanism (not illustrated) to detect rotation of the programmable device 201 approximately 90 degrees with respect to the horizon and may be adapted to rotate text and graphics on the graphical display 203 to reflect such rotation. In such cases the upper edge 219 or bottom edge 223, depending on direction of rotation, are referred to as the left edge.

FIG. 3 is a block diagram illustrating the organization of programs stored in a memory unit 315 that is an example of a memory unit such as 215 in FIG. 2. The memory unit 315 contains, for example, a system program memory 301 and an application program memory 303. The system program memory 301 is, for example, a ROM, whereas, the application program memory is a programmable non-volatile memory, e.g., flash-memory or erasable programmable read-only memory (EPROM). Alternatively, the system program memory 301 is also programmable non-volatile memory to allow updates of system programs.

The system program memory 301 contains an IDE 305. The IDE 305 contains a program editor and an interpreter. Alternatively, the IDE includes a compiler and linker.

The IDE 305 is used to create application programs 307, which are stored in the application program memory 303. The IDE 305 displays program source code of application programs 307 on the graphical display (see 203 in FIG. 2).

The IDE 305 performs many functions, such as program editing, syntax check, and program interpretation. For example, the IDE 305 causes the processor (see 209 in FIG. 2) to display an application program 307, either while a programmer is editing the application program 307 or to allow a user of the programmable device to read an application program 307 that has previously been stored in the application program memory 303.

In an aspect of the function of displaying an application program 307, the IDE 305 displays color queues indicative of program control structure opening and closing statements. In an alternative version, the IDE 305 provides a shading or highlighting of initial characters of program statements to indicate nesting level of program code (the word "shading" is used herein to refer to both shading and highlighting of characters). In an alternative, these two techniques are used in conjunction with one another. The initial character shading of successive lines of code are made to align with the first character of each line of code; thereby, the right edge of the shading provides a visual indication of the nesting level of the line of code.

Figure 4:
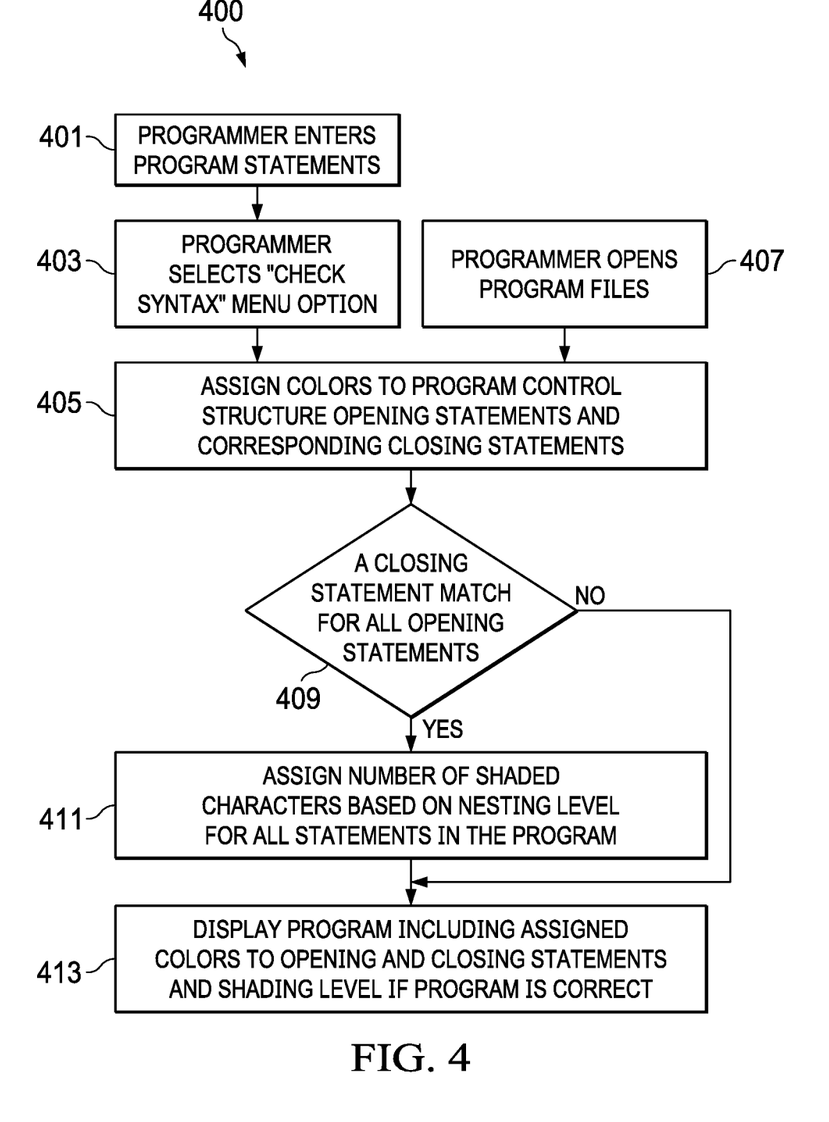
FIG. 4 is a flow-chart illustrating steps in assigning color queues associated with program structures of different scope.

FIG. 4 is a flow-chart 400 illustrating steps in assigning color queues associated with program structures of different scope. Reference to the portions of FIG. 3 that perform the steps is noted in the description hereinbelow of FIG. 4.

The flow-chart 400 provides two alternative paths: one that starts with a programmer entering program statements, step 401, using the IDE 305 (see FIG. 3) and another that starts with a programmer (or other user) opening, step 407, a program file stored in the application program memory 303 (see FIG. 3). The program statements, whether entered by a programmer or read from a program file, includes control structure opening and closing statements. As discussed in greater detail hereinbelow, the closing statements may be explicit, e.g., ENDIF statements, or implicit from special character sequences or shading assigned to program lines. In the case where a programmer edits a program, step 401, a programmer may select a "Check Syntax" menu option. This option would trigger the IDE 305 to perform various syntax checks, including the assignment of colors to control structures. In the case of a program file being opened, step 407, one task performed by the IDE 305 when opening a program file is to perform syntax checks, which also includes the assignment of colors to control structures. Thus, the two paths merge on the step of assigning colors to program control structure opening statements and closing statements, step 405.

The assignment of colors to control structures, step 405, is discussed in greater detail below. A use case example is provided in FIGS. 7a through 7d, wherein for FIGS. 7a through 7c, color assignment illustrate errors in a syntactically incorrect program and the progression towards correcting those errors and in which color assignment for control structures is provided for a syntactically correct program in FIG. 7d. In the figures, which are black and white, frames are used to show statements displayed in color and the style of the lines and/or line weights indicate a common color. As can be seen in Line 2 of FIG. 7d, a FOR statement that starts a FOR loop has been assigned a selected color as shown by the rectangular frame, for example the color red. This FOR loop is closed by the END statement on Line 13. Consequently, the statement on Line 13 has the same style rectangular frame and is also assigned the color red. Similarly, control structures that occur inside the aforementioned FOR loop and that, consequently, are at a deeper nesting level, are assigned other colors, such as the FOR loop beginning and ending on Lines 3 and 12, respectively (assigned another different color as shown by the different rectangular frame (in the example, a thicker line-weight for the frame) around the text, for example green), the IF statement of Lines 4, 5, 7 (assigned yet another different color, for example, the color blue, as indicated by the dashed lines of the frames), and the IF statement of Lines 8, 9, 11 (assigned another color, purple for example, as indicated by the shorter-dashed lines in the frames surrounding the text).

Figure 7A:
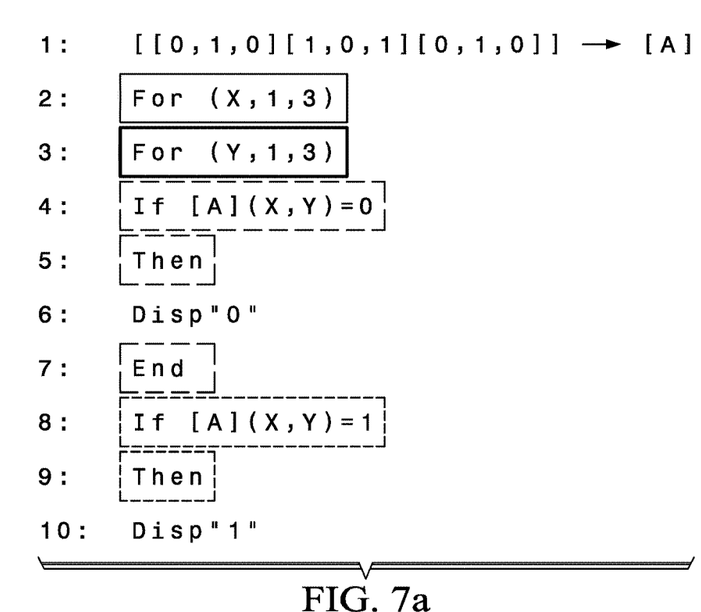
FIGS. 7a through 7d are program listings illustrating color assignment to program flow-control structures at different stages of error correction.
Figure 7B:
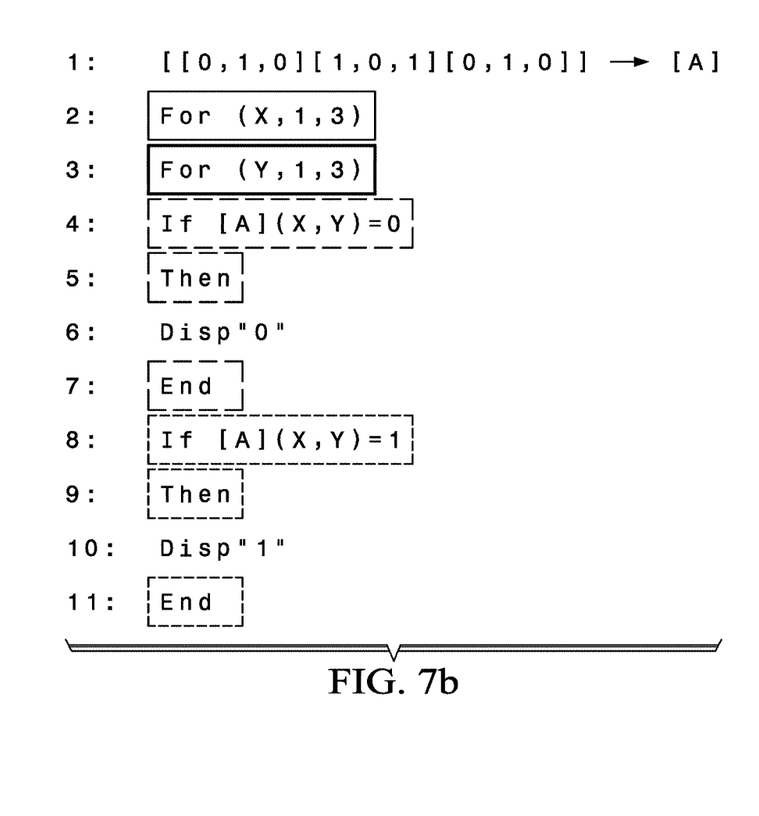
Figure 7C:
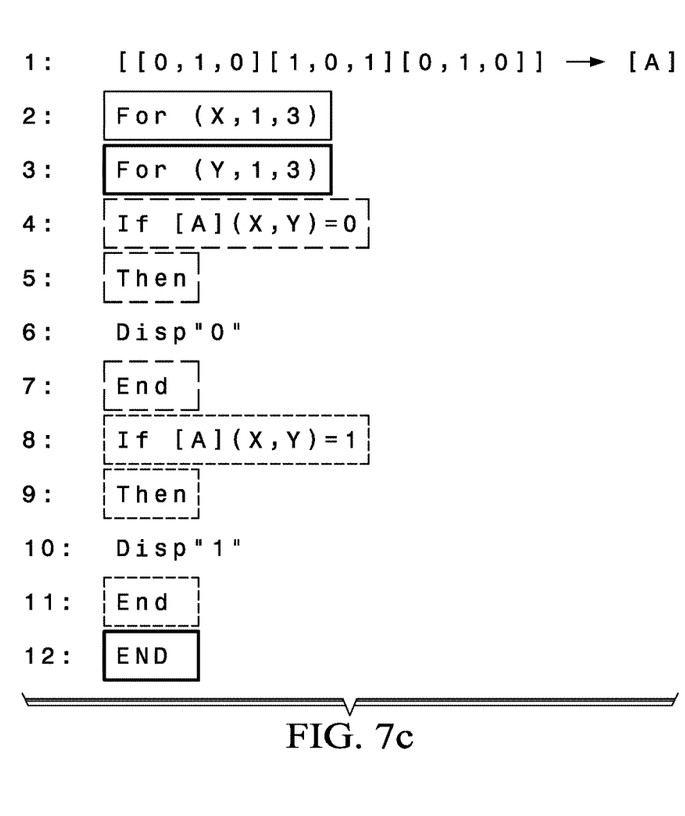
Figure 7D:
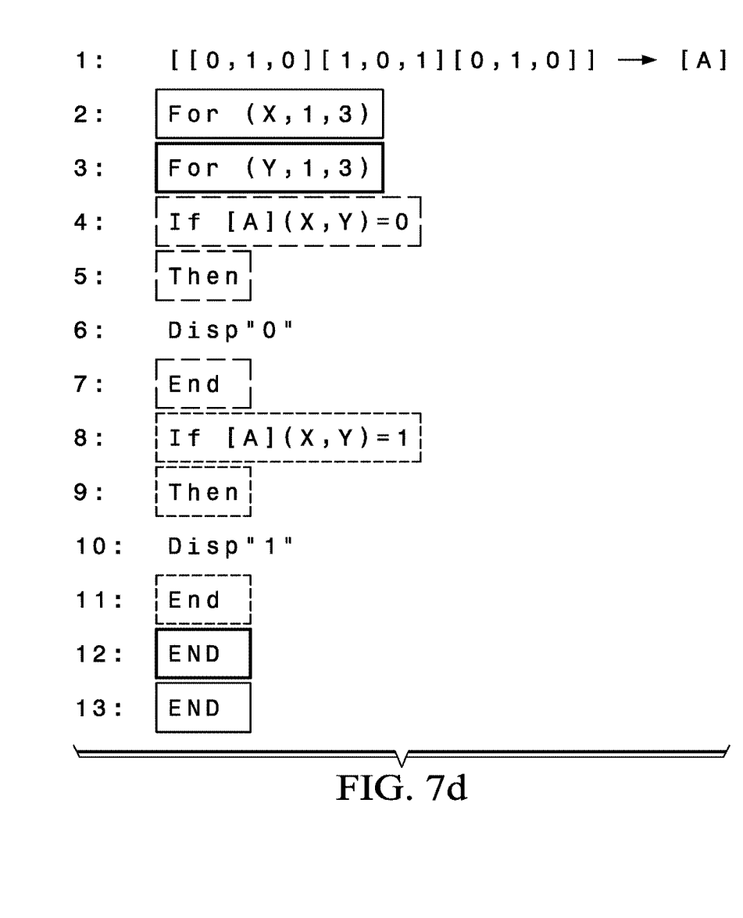

In contradistinction to customary programming conventions, in which indentation is used to signify that program statements belong to different nesting levels, the programs displayed by IDE 305 are not indented, as is illustrated in, for example, FIG. 7d. Each line of program code starts at a position at the left edge of the visual portion of the display, or at a common starting position adjacent to the left edge, and the lines are displayed without indentation with respect to one another, preserving display space for program statements when compared to indented displays.

Returning now to FIG. 4, a program that is syntactically correct has a one-to-one match between control-structure opening and closing statements. For example, in the example of FIG. 7d, each opening statement had a matching closing statement. Accordingly, the CHECK SYNTAX function of the IDE 305 (FIG. 3) determines if there is such a match between control structure opening and closing statements, step 409.

To further provide a programmer with information pertaining to nesting-level of various program statements that make up a program, information that is lost due to the absence of indentation of program statements, the programs can be displayed with shading of the first few characters of each program statement. The number of shaded characters is greater the deeper the nesting level is. For example, the highest level may have no characters shaded, the next level has the first character shaded, and a program statement at nesting-level two has the first two characters shades, and so on.

Figure 8:
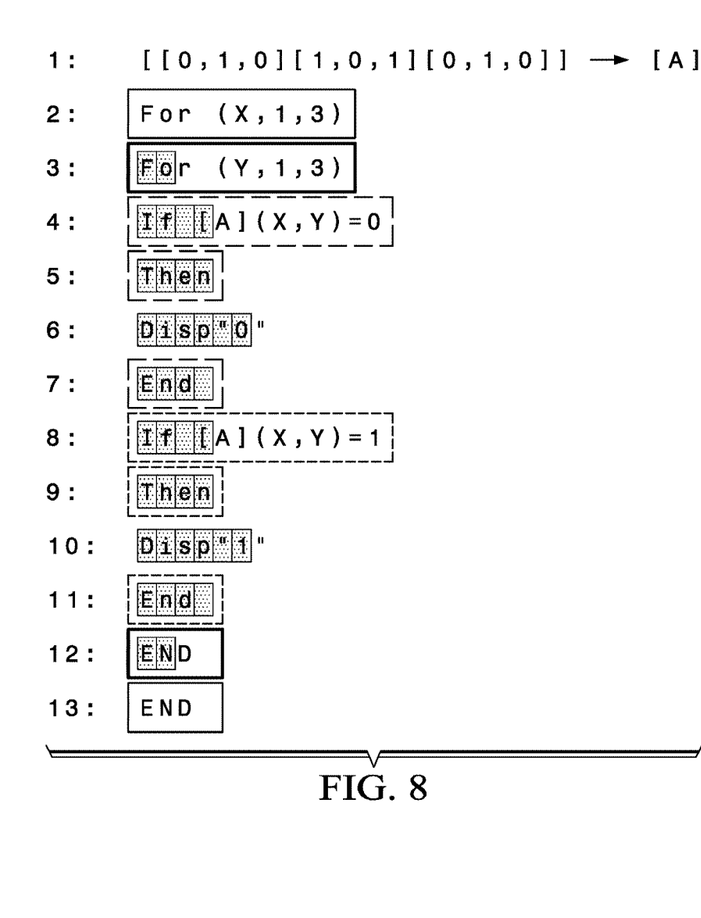
FIG. 8 is a program listing illustrating initial-character shading used to indicate nesting level of program statements.

An example of the assigned shading levels of the program in FIG. 7d is illustrated in FIG. 8. Statements on Lines 1, 2, and 13 are at the highest nesting level (nesting level 0) and therefore are displayed without shading, statements on Lines 3 and 12 are at nesting level 1 and therefore are displayed with one character shaded, and so on.

Accordingly, the IDE 305 (see FIG. 3) assigns the number of shaded characters based on the nesting level for all statements in the program, see step 411 in FIG. 4. If, on the other hand, the syntax check determines that program control structure opening and closing statements are not balanced (e.g., there are not enough closing statements), as determined in step 409, the assignment of shading to program statements based on nesting level is bypassed. The consequent absence of a shading hierarchy provides a programmer with an additional visual clue of programming errors.

Finally, the IDE 305 (again shown in FIG. 3) displays the program, with color assignments for program structure opening and closing statements and program statement shading (if any), at step 413.

Figure 5:
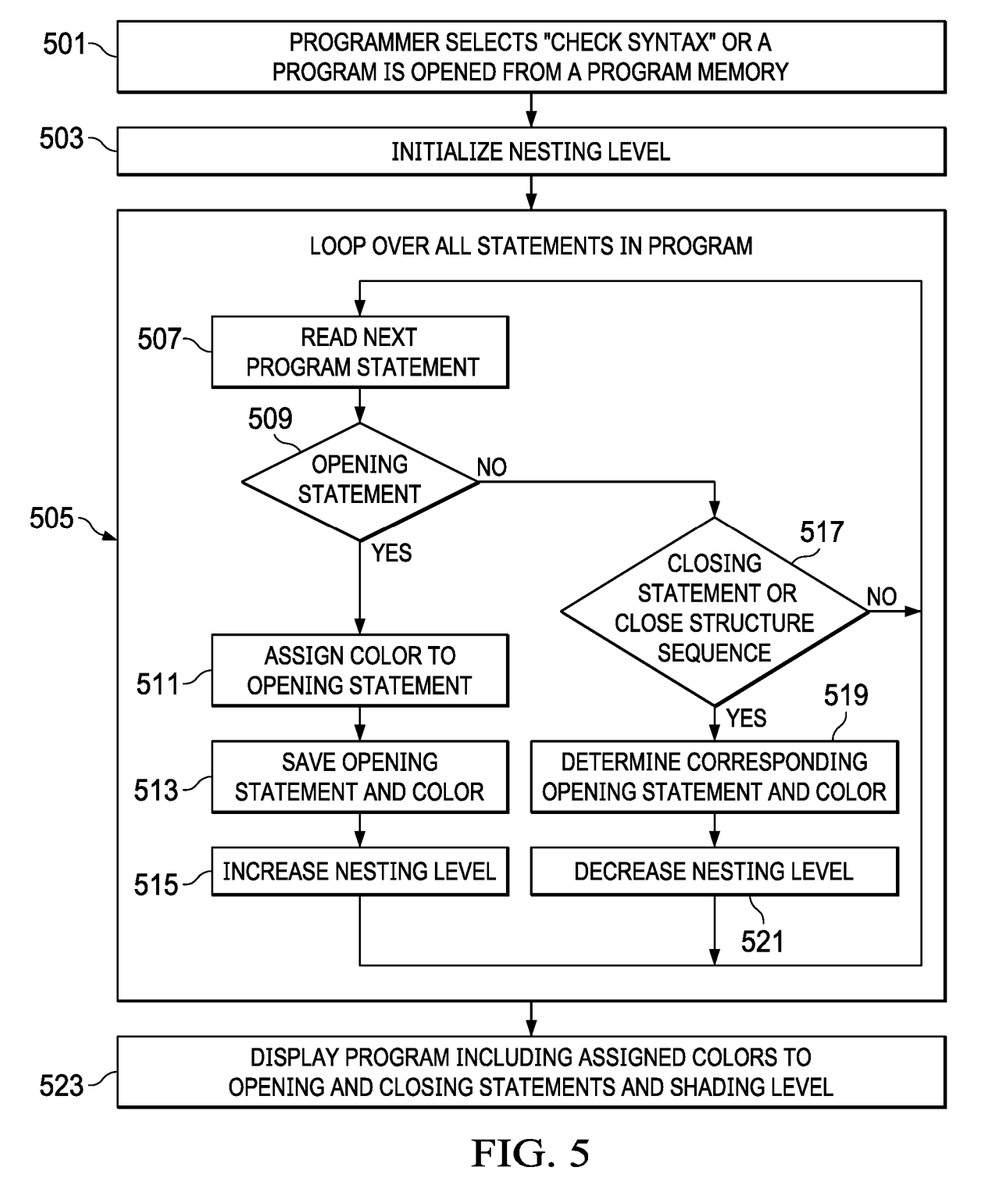
FIG. 5 is a flow-chart illustrating more detail for assigning colors to program control structures while a program is being edited or is opened.

FIG. 5 is a flow-chart illustrating one mechanism for assigning colors to program control structures while a program is being edited or is opened. The mechanism illustrated in FIG. 5 is executed by the IDE 305 (see FIG. 3) in response to a programmer selecting a "CHECK SYNTAX" menu item or when a program is opened from program memory 301 (shown in FIG. 3), step 501.

As is discussed in greater detail below, in one alternative version of IDE 305, an initial-color shading is applied to program lines to indicate nesting level. In such versions, the nesting level is therefore initialized, step 503. The nesting level for the first program statement read would be the lowest level (e.g., level zero) for which no initial-character shading is applied. One mechanism for managing control structure opening and closing statements to determine their correspondence is to use a stack (as described in greater detail hereinbelow). Thus, in such a version of the mechanism, initializing the nesting level is automatically achieved by ensuring that the stack is empty.

A color-assignment and nesting-determination loop 505 is executed by the IDE 305 (FIG. 3). The color-assignment and nesting-determination loop 505 loops over all program statements in the program being edited or being opened from the program storage 301 (in FIG. 3) Thus, for each iteration of the color-assignment and nesting-determination loop 505, the IDE 305 reads the next program statement of the program being edited or reads a program statement from program memory, step 507.

The IDE 305 (FIG. 3) determines if the program statement is a control flow opening statement, step 509.

If the program statement is a control flow opening statement, the IDE 305 (in FIG. 3) assigns a color to the opening statement, step 511. Preferably, each control structure has a unique color assigned thereto.

Furthermore, as opening statements and closing statements are matched by the IDE so that corresponding opening and closing statements are assigned the same color, the IDE 305 saves the opening statement in a data structure so that it may be retrieved when a closing statement is encountered, step 513. In at least one version of the IDE 305, control structure opening statements and corresponding colors are managed on a stack. In that embodiment, the opening statement and its color are pushed onto the stack.

In versions wherein initial-character shading is applied to indicate the nesting level of program statements, if the program statement is a control structure opening statement, the nesting level is increased, step 515. In the alternatives in which opening and closing control structure statements are managed on a stack, the nesting level is the current stack depth (e.g., if the stack is empty), nesting level is zero, and if the stack has one entry, nesting level is one.

If the program statement is determined to not be a control structure opening statement, step 509, the IDE 305 (see FIG. 3) determines if the program statement (or some alternative key-stroke sequence) is a control structure closing statement, step 517 (e.g., for BASIC, an "END" statement).

Some programming languages (e.g., Python) do not provide explicit closing statements. Rather, such programming languages rely on implicit structures to define the end of program control structures. For example, in Python the indentation level of program statements define to which control structure a particular statement belongs.

Thus, the closing of a control structure, in the event of programming language with explicit control structure closing statements, would be the entry of a closing statement that corresponds to the current innermost opening statement. For example, for BASIC, if the current control structure has an opening IF statement, the entry of an END would close the control structure, triggering the assignment of the color and the decrease of nesting level.

However, if the programming language is a language without explicit programming language control structure closing statements (e.g., Python), the programmer indicates to the editor that the control structure is closed. In one alternative, when the cursor indicating a character entry location is located at the beginning of a line, the programmer may enter a special character sequence, for example, "shift key+cursor left key." This key sequence does not move the cursor. Rather the specific key sequence is interpreted by the editor as the termination of the current control structure and, consequently, the removal of shading of characters corresponding to one nesting level.

If not, the IDE 305 continues with step 507 for the next program statement.

If the program statement is a control flow closing statement, there should be a corresponding opening statement. Thus, the IDE 305 (see FIG. 3) attempts to determine the corresponding opening statement, step 519.

In one arrangement, the IDE 305 matches closing and opening statements from the inside out. A closing statement is matched with the innermost opening statement that does not already have a matching closing statement (e.g., if two control structures are encountered, the first encountered closing statement will pair with the second beginning structure and the following closing statement pairs with the first).

In at least one version of the IDE 305, whenever a control flow opening statement is encountered, the control flow opening statement and its associated color are pushed onto a stack. Thus, when, in step 517, a closing statement is encountered, the statement and color on top of the stack are popped off of the stack in step 519. The color popped off of the stack is assigned to the closing statement.

When processing a control structure closing statement, the IDE 305 (in FIG. 3) decreases the nesting level, step 521. As noted, if the control structure open statements are managed on a stack, decreasing the nesting level is automatically achieved as nesting level equals stack depth.

Having processed a statement, whether a control-flow structure statement or another statement, the color-assignment and nesting-determination loop 505 continues with reading the next statement, step 507, until all statements in the program have been processed.

Having processed all statements in the program, the program is displayed by the IDE 305 on the display screen 203 (see FIG. 2) with the appropriate color for the control structure opening and closing statements, step 523. In an alternative arrangement, all the statements belonging to a particular control structure are assigned the same color as the opening and closing statements.

Figure 6:
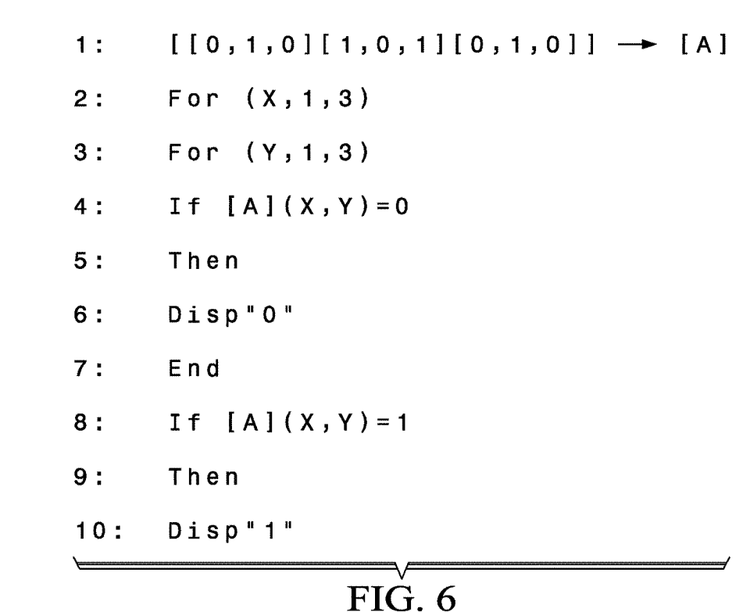
FIG. 6 is an example program listing.

Turning now to an example, consider the program listed in FIG. 6. An inspection of this code snippet reveals unbalanced program-flow control structures. However, that unbalance is even more readily observed when the hereinabove described assignment of colors is applied. In alternative arrangements, shading or differing fonts for the program structures can be used to aid in observing unbalanced structures.

In FIG. 7a, the procedure of FIG. 5 has been applied to the 10 lines displayed in FIG. 6. In FIG. 7a, a programmer may have selected the "CHECK SYNTAX" menu item.

In FIG. 7a through 7d, program statements that would displayed in color on the display screen 203 (in FIG. 2) are illustrated in the black and white drawings using frames surrounding the program statements. Statements having like frames are displayed in the same color and a color that is different from statements with other style frames. Dashed lines and line weight of the frames indicates a different color than other frames. The following is an example legend (however, any color mapping may be used), wherein line numbers refers to the lines in FIGS. 7a through 7d (note higher numbered lines do not appear in all of FIGS. 7a through 7d):

| | | |
|---|---|---|
| No frame | Lines 1, 6, 10 | Black |
| Single-weight solid | Lines 2, 13 | Red |
| Heavy solid | Lines 3, 12 | Green |
| Wide dash | Lines 4, 5, 7 | Blue |
| Short dash | Lines 8, 9, 11 | Purple |

In the alternative illustrated in FIGS. 7a through 7d (as well as in FIGS. 8 and 9), statements that are not control flow statements (e.g., Lines 1, 6, and 10) are not assigned a unique color. Rather these statements are all displayed in a black font. In an alternative, these statements may be displayed in the same color as the control structure to which they belong.

The IDE 305 (see FIG. 3), acting according to the process of FIG. 5, locates the opening statements of Lines 2, 3, and 4/5. These are assigned colors, for example red, green, and blue, respectively. The colors are indicated in the black and white drawings by the use of the different frames as described hereinabove. At that point, the stack would have the following entries:

LINE 4/5—blue←stack pointer
LINE 3—green
LINE 2—red

Next the process arrives at the END statement of Line 7. This statement is a control structure closing statement that corresponds to the IF statement of Lines 4/5. Thus, in encountering the END statement, the process determines that the corresponding opening statement is the statements of Lines 4/5.

In the version wherein the mechanism is implemented using a stack, the top of the stack is popped off and the color blue is assigned to the closing statement of Line 7. The stack at this point contains the following entries:

LINE 3—green
LINE 2—red

The opening statement of Line 8/9 is then encountered and it is assigned a new color, here for example, purple (indicated in the black and white drawings by a frame surrounding the text with a shorter-dashed pattern).

When the program end has been encountered, by the IDE 305, an imbalance in the opening and closing statements is noted. This condition would be manifested by a non-empty stack. Therefore, an error condition is registered.

The final stack corresponding to FIG. 7a is:
LINE 8/9—purple←stack pointer
LINE 3—green
LINE 2—red In an example arrangement, when an error condition has been registered, the nesting levels are not displayed.

In FIG. 7b, the programmer corrects the first error by adding a closing "END" statement at Line 11. This causes the popping of the LINE 8/9 purple entry from the stack and the statement at Line 11 is assigned the color purple. This is indicated by the frame surrounding the text on Line 11 in FIG. 7b.

FIGS. 7c and 7d illustrate the programmer correcting further errors caused by imbalance of closing statements to opening statements.

Thus, in one alternative, certain program statements are displayed using colors that are uniquely assigned to each control structure. In another alternative, the same program statements are displayed using frames surrounding the program statements, wherein identical frames are used to display statements that belong to corresponding opening and closing control structures. In yet another alternative, the unique fonts are associated with each control structure. In each of these alternatives, the lines are displayed starting at either the left most edge of the visible display or with each line starting at a same left position for starting the lines adjacent the left most edge. That is, the lines are not indented with respect to one another, which preserves the amount of room for displaying the lines even as the program nesting levels increase.

After the programmer has corrected the final error in FIG. 7d, there is balance between control-flow structure opening and closing statements. Accordingly, in the version of the arrangements wherein the initial few characters of a line are shaded, at this point that shading is displayed, as is illustrated in FIG. 8.

Initially, the nesting level is zero. Therefore, Lines 1 and 2 have no initial-character shading. After the first FOR statement (Line 2) has been encountered, the nesting level is one. In the version employing a stack, the stack has one element in it, which corresponds to the nesting level of one. As the nesting level increases, the number of shaded characters also increases. For example, at Line 6, the nesting level is three because Line 6 is nested inside the control structures of Lines 2, 3, and 4/5. Finally, when all statements have been processed, the nesting level returns to zero. Thus, Line 13 is displayed without initial-character shading.

Figure 9A:
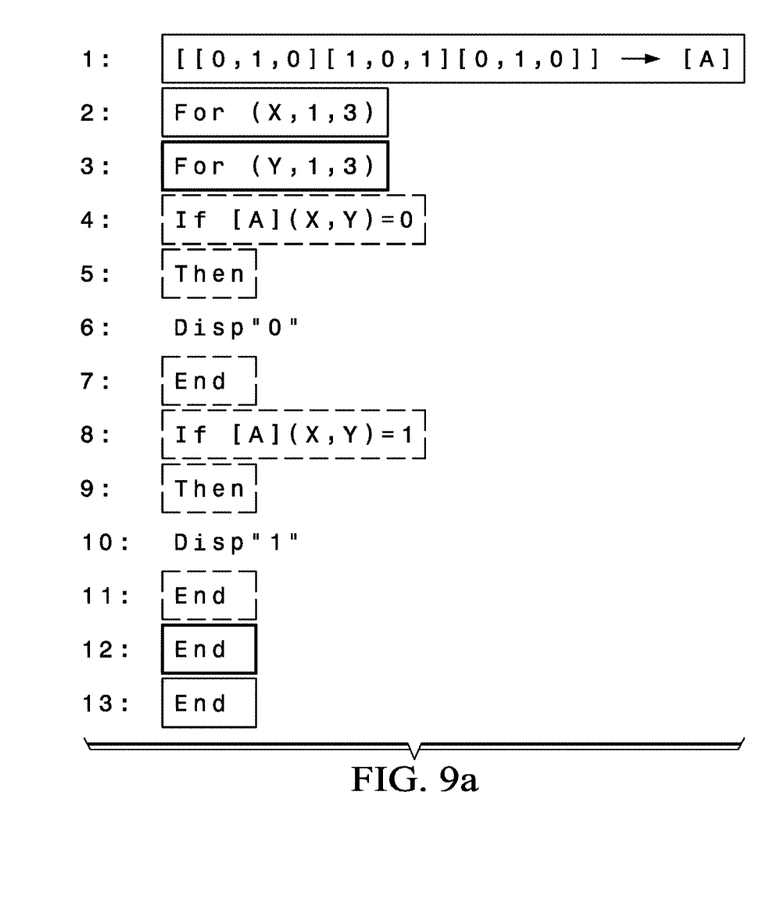
FIGS. 9a and 9b are program listings in which control structure color assignment is based on nesting level.

FIGS. 9a through 9d are program listings illustrating an alternative control-structure coloring scheme in which statements of the same nesting level are assigned the same color during the progression of program editing of a program having several unbalanced control structures (FIG. 9a) to a program with balanced control structures (FIG. 9d). The program of FIGS. 9a through 9d is logically the same as the program of FIGS. 7a through 7d and 8.

In the alternative coloring scheme of FIG. 9a, the lowest nesting level (level 0), is given the color red, the next nesting level (level 1), green, the next nesting level (level 2), blue, and the innermost nesting level (level 3), black. Accordingly, the Lines 1, 2, and 13, being of nesting level 0, all have the same color, namely, red. The FOR statement of Line 2 increases the nesting level. Thus, the statements inside it are assigned a different color; here, green. The most notable difference between FIG. 9a, one the one hand, and the alternative described in conjunction with FIG. 5 and the example of FIGS. 7a through 7d, on the other hand, is that in FIG. 9a, the control structure of Lines 4, 5, and 7 and the control structure of Lines 8, 9, and 11 are given the same color, blue, because all these statements belong to nesting level 2. Similarly, the statements at Lines 6 and 10, while belonging to different control structures, are both at nesting level 3, and, therefore, are assigned the color black.

Figure 9B:
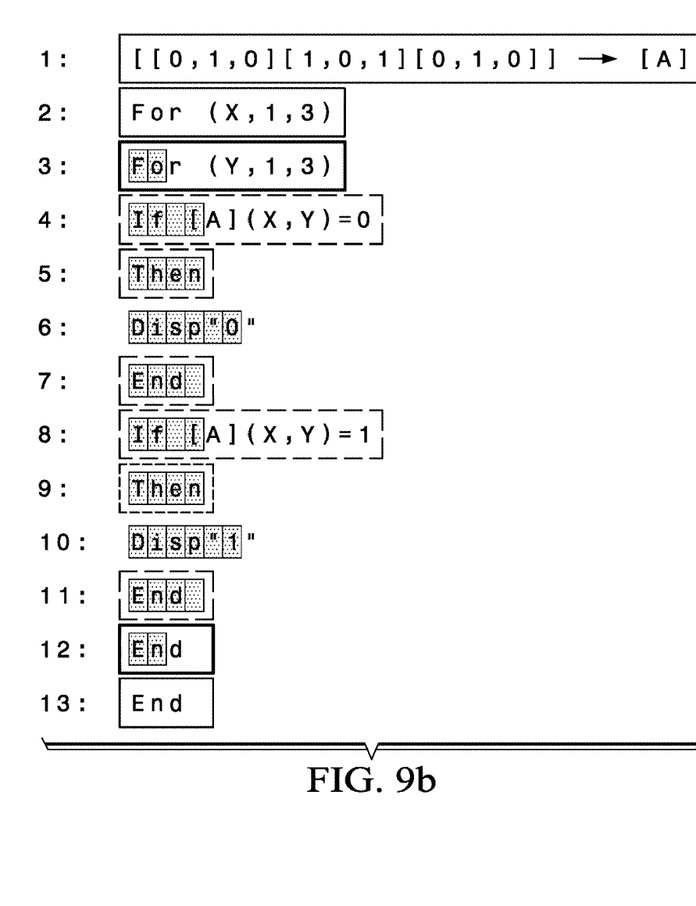

As with the illustrations of FIGS. 7 and 8, colors are represented in FIG. 9 using solid and dashed frames, which may alternatively be displayed on the display screen 203 to indicate different nesting levels.

FIG. 9b illustrates an alternative in which the mechanism for adding color to indicate nesting levels is further augmented with shading the initial characters of a line proportionally to the nesting level, here by shading 2*n characters at the beginning of each line where n is the nesting level of the line.

Figure 10:
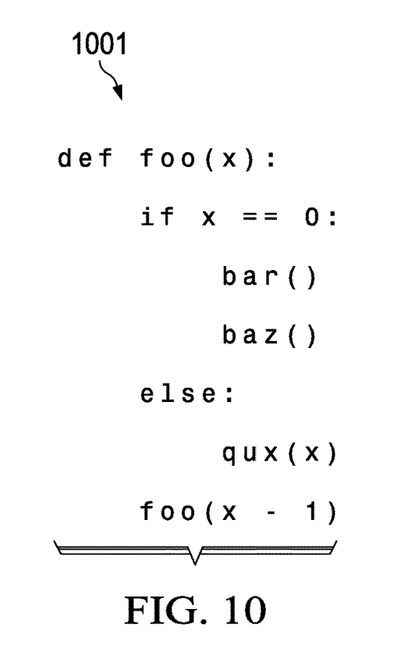
FIG. 10 is a program listing of a program written in a programming language without explicit control structure closing statements in which indentation indicates to the IDE how to interpret program control structures.

As discussed hereinabove, programming control structures may be explicitly closed (e.g., an "ENDIF" statement in BASIC). However, some programming languages, for example, Python, do not close control structures with explicit control structure closing statements. Consider, for example, the programming language Python. Python uses the indentation level provided in a program to determine to which control structure a statement belongs. FIG. 10 illustrates the indentation of a Python program 1001. In the Python program 1001, the statements if x==0:, else:, and foo (x−1) belong to the control structure opened by the def foo (x): statement. The statements bar ( ) and baz ( ) belong to the control structure opened by the if x==0: statement. Similarly, the qux (x) statement belongs to the control structure that is opened by the else: statement. However, because the foo (x−1) statement is dedented with respect to the qux (x) statement, the Python interpreter interprets the dedention of the foo (x−1) statement as the termination of the control structure with the qux (x) statement. Consequently, the qux (x) statement to be the final statement of the control structure that is opened by else:. Conversely, foo (x−1) falls outside of the scope of the else: control structure as well as outside of the if x==0: control structure; foo (x−1) is executed regardless of the value of x.

Figure 11:
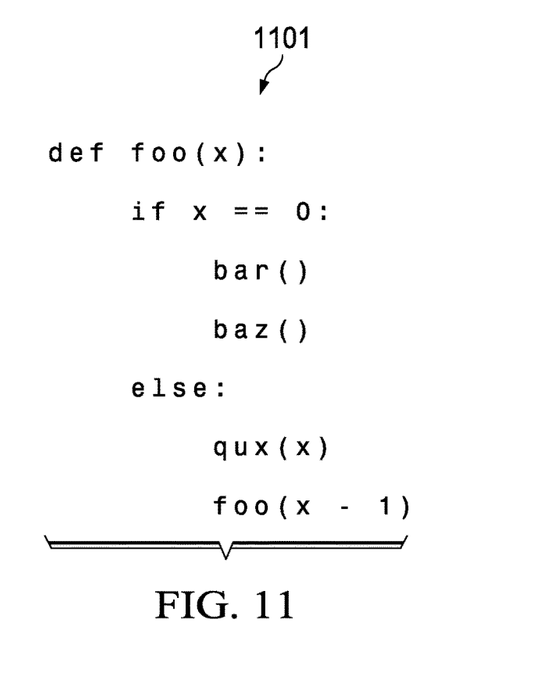
FIG. 11 is a program listing that has different indentation vis-à-vis the program listing of FIG. 10.

Consider now the program of 1101 of FIG. 11, which is an illustration of the program 1001 of FIG. 10 with a slightly different indentation. In the program 1101, the last statement foo (x−1) has the same indentation level as the qux (x) statement. Therefore, the Python interpreter, in the case of program 1101, interprets foo (x−1) to fall in the same control structure—namely, the control structure opened by else: —as qux (x). The control structure started by the else: statement is terminated by the end of the program.

Figure 12:
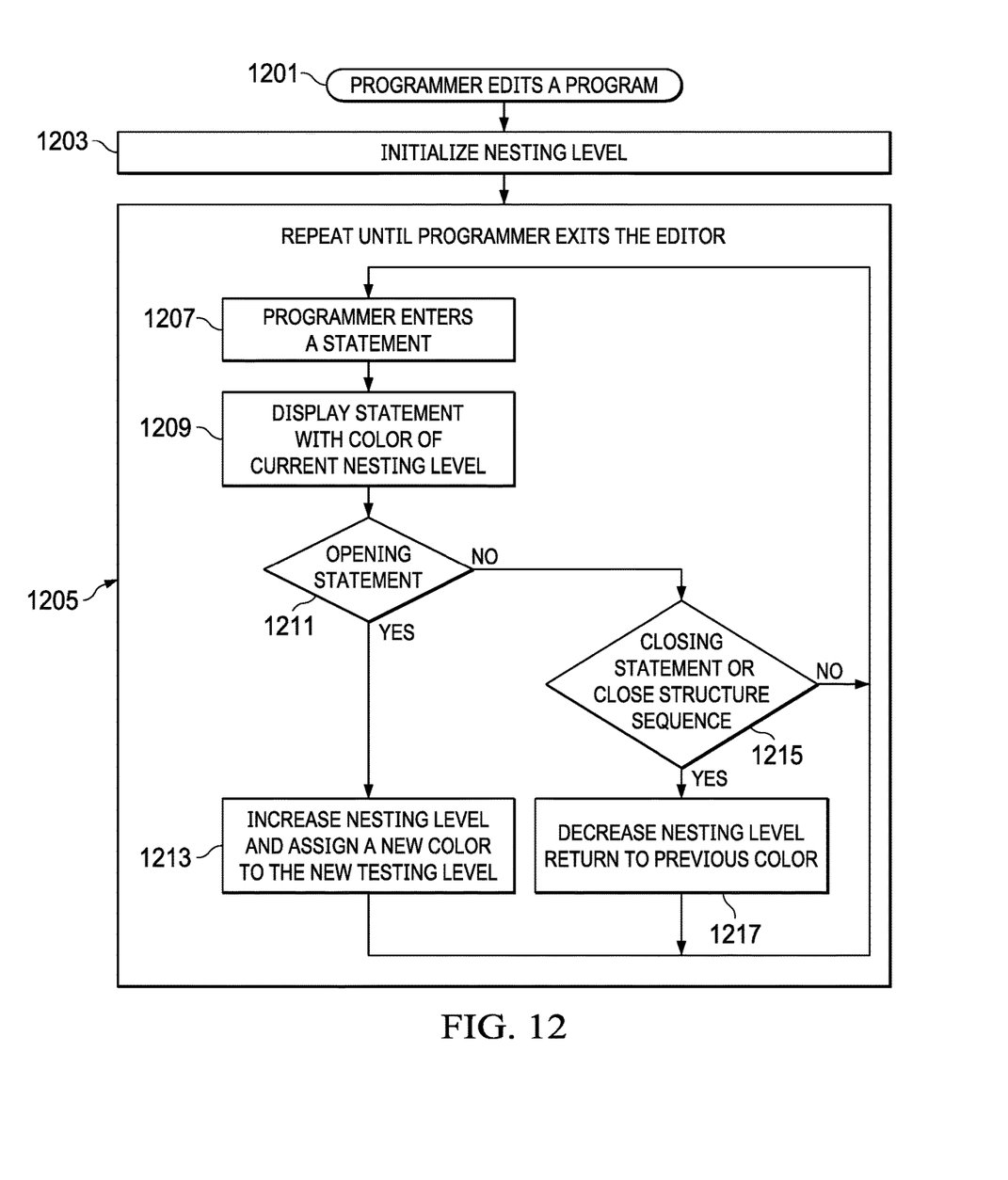
FIG. 12 is a flow-chart illustrating more detail for assigning colors to program control structures based on nesting level of control structures.

FIG. 12 is a flow-chart illustrating more detail for assigning colors to program control structures based on nesting level of control structures.

While in FIG. 5, assignment of control structure colors and shading is performed either in response to the programmer selecting a "CHECK SYNTAX" menu option or when a program is being read from program memory, in the alternative of FIG. 12, the color assignment and nesting level is assigned while a program is being edited 1201. While color and shading assignment during editing applies both to control-structure color-assignment in the style of FIG. 7 and FIG. 8 as well as to the nesting-level color-assignment in the style of FIG. 9, the flow diagram of FIG. 12 is described in conjunction of the latter and, in particular, with respect to programs written in programming languages without explicit control structure closing statements.

The program may be either a program with explicit control structure closing statement, (e.g., written in BASIC) or a program with implicit control structure closing statements (e.g., written in Python). The nesting level is initialized, step 1203. If the programmer is creating a new program, the nesting level would be set to zero. If the programmer is editing an existing program (e.g., the program is read from memory), each program statement has a nesting level that was previously established. That nesting level may either be inferred while reading the program, as described in conjunction with FIG. 5 hereinabove, or established when the program is edited.

The editor of the IDE loops perpetually until the programmer exits the editor. In a first step of the main editor loop 1205, the programmer enters or edits a program statement, step 1207. Regardless of what kind of statement the statement is, a color is assigned to the statement based on the current nesting level as described hereinabove in conjunction with FIG. 9, step 1209.

If the statement entered by the programmer is a control structure opening statement, step 1211, the nesting level is increased, step 1213. Thus, statements within the body of a control structure are displayed in a color associated with one nesting level deeper than the control structure opening statement.

Alternatively, the programmer may indicate the closing of a control structure, step 1215.

If the programmer indicated closing of a control structure, step 1215, the editor decreases the nesting level, step 1217, which reduces the number of characters at the beginning of a line that are displayed as shaded for the next statement which would be entered upon the next iteration of the main editor loop 1205.

Figure 13:
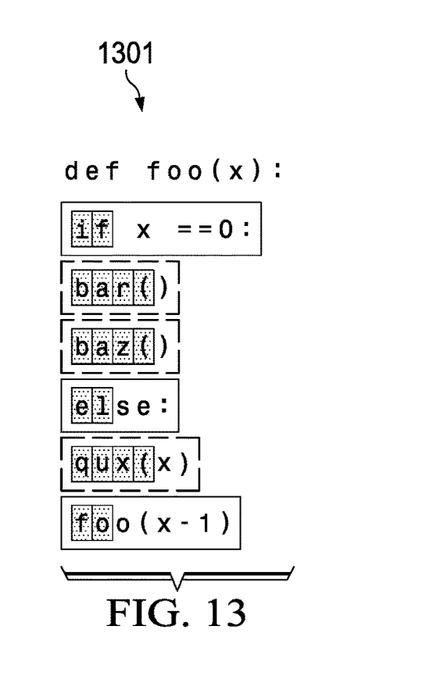
FIG. 13 is an example how control structure coloring and line shading may appear in the IDE when control-structure coloring is based on nesting level.

FIG. 13 is an example how control structure coloring and line shading may appear in the IDE 305 when applied to the Python program 1001 of FIG. 10 wherein the coloring is based on nesting level (as with the illustrations of FIGS. 7, 8, and 9, colors are represented in FIG. 13 using solid and dashed frames, which may alternatively be displayed on the display screen 203 to indicate different nesting levels). The statements at the first nesting level share the color red and are at the first nesting level, all being nested within the def foo (x): control structure. The first nesting level is here indicated by shading 2*n characters, i.e., for the first nesting level two characters. The deeper nested statements, bar ( ), bas ( ), and qux ( ), are assigned the color blue, have a nesting level of two and, consequently, have 2*2 shaded characters (as noted above, the number of shaded characters that are added for each nesting level is somewhat arbitrary; two is used in the illustrative examples).

For programming languages without explicit control structure closing statements (e.g., Python), the number of shaded characters may serve the additional purpose of indicating the program structure to the programming language interpreter in the same manner as indentation (e.g., tab characters) are otherwise used. Thus, a Python interpreter of IDE 305 would interpret the decrease in number of shaded characters as a closing of a control structure block. Alternatively, because the shaded characters are a display features, the saved version of a program may save tab characters (or tab character equivalents) for the purpose of program interpretation while displaying shading in lieu of indentation when such tab characters are encountered.

A mechanism is disclosed in which a programmable device is has an integrated development environment in which program indentation is avoided while still providing a programmer of the programmable device with visual queues indicative of nesting of program control-flow structures, unbalance of such structures, and the matching of opening and closing statements of control-structures. The program is displayed on the visual display with each line or statement of the program starting at common position adjacent to or at the left most edge of the visual display. The hereinabove described technology enhances the programmability of programmable devices that have small screens, which would be too narrow for displaying heavily indented programs.

Modifications are possible to the described example arrangements. Such other arrangements are possible within the scope of the claims.

The invention claimed is:

1. A method for providing visual feedback of balancing of programming structure hierarchy in a program entered on a programmable device, comprising:
 receiving at least two control structure opening statements, each having an associated control structure;
 assigning a unique color to each of the at least two control structures;
 displaying each control structure opening statement in the unique color assigned to the corresponding associated control structure;
 receiving at least two control structure closing sequences; and
 associating each control structure closing sequence with one of the control structures, respectively;
 wherein the control structure opening statements and the control structure closing sequences start at a common starting position on an edge of a display of the programmable device.

2. The method of claim 1, wherein the closing sequence is an explicit programming language control structure closing statement; and
 further comprising displaying each closing statement in the unique color assigned to the control structure corresponding to each closing statement beginning at the same location with respect to the left edge.

3. The method of claim 1, wherein the closing sequence is a special input sequence, the method further comprising in response to receiving the special input sequence, interpreting the special input sequence as a control structure closing sequence.

4. The method of claim 1, further comprising:
   assigning a nesting level to each control structure opening statement and closing sequence; and
   wherein the step of assigning a unique representation to each control structure comprises assigning a same unique representation to control structures of the same nesting level.

5. The method of claim 4, wherein at least one control structure further comprises a body, the method further comprising assigning a nesting level to the body that is one level deeper than the nesting level of a control structure opening statement and control structure closing sequence.

6. The method of claim 1, further comprising:
   determining whether for each control structure opening statement the program contains a corresponding control structure closing statement; and
   upon determining that for each control structure opening statement the program contains a corresponding control structure closing statement, displaying a shaded background in the statements along a left line starting point adjacent the left edge of the display indicative of a nesting level of each line of the program displayed on the display.

7. The method of claim 6, further comprising:
   during interpretation of a program, using an indication of reduction of nesting level as indicative of closing of a program control structure.

8. The method of claim 7, wherein the indication of reduction of nesting level is a reduction of number of initial shaded characters at a left line starting point adjacent the left edge of a line of the program shown on the display.

9. The method of claim 1, further comprising retrieving a program from an instruction memory including receiving control structure opening statements and control structure closing sequences.

10. The method of claim 1, further comprising receiving program statements entered by a user of an integrated programming environment of the programmable device and receiving program statements entered by a user of an integrated programming environment including receiving control structure opening statements and control structure closing sequences.

11. The method of claim 1, wherein each control structure has a hierarchical level ranging from outermost to innermost and a scope associated therewith, and wherein associating each control structure closing statement with one of the control structures comprises:
   determining all control structures that have a scope encompassing the closing statement; and
   associating the closing statement with the control structure that has an innermost hierarchical level of the control structures that have a scope encompassing the control structure closing statement.

12. The method of claim 1, wherein the program is a program written in BASIC programming language.

13. A programmable device, comprising:
   a processor;
   an input device connected to the processor;
   a display connected to the processor and having a left edge;
   a program memory connected to the processor; and
   an instruction memory connected to the processor and storing instructions executable by the processor;
   the instruction memory including an integrated programming environment comprising instructions which, when executed by the processor, cause the processor to:
      receive at least two control structure opening statements, each having an associated control structure;
      assign a unique color to each control structure of the at least two control structures;
      concurrently display each control structure opening statement in the unique color assigned to the corresponding control structure;
      receive at least two control structure closing sequences; and
   associate each control structure closing sequence with one of the control structures;
      wherein the control structure opening statements and the control structure closing sequences start at a common starting position on an edge of a display of the programmable device.

14. The programmable device of claim 13 wherein the unique representation is selected from a group consisting essentially of color, font, and frame style.

15. The programmable device of claim 13, wherein the closing sequence is an explicit programming language control structure closing statement; and the instructions executed by the processor further comprising instructions to concurrently display each control structure closing statement in the unique color assigned to the corresponding control structure beginning at a determined location adjacent to or at the left edge.

16. The programmable device of claim 13, wherein the closing sequence is a special input sequence, the instructions executed by the processor further comprising instructions to receive the special input sequence, interpreting the special input sequence as a control structure closing sequence.

17. The programmable device of claim 13, the instructions executed by the processor further comprising instructions to assigning a nesting level to each control structure opening statement and closing sequence; and
   wherein assigning a unique representation to each control structure comprises assigning a same unique representation to control structures of the same nesting level.

18. The programmable device of claim 13, wherein the programmable device is a programmable graphing calculator.

19. The programmable device of claim 13, wherein the programmable device is a handheld diagnostic device.

20. The programmable device of claim 13, wherein the programmable device is a smartphone or tablet.

* * * * *